3,192,643
APPARATUS FOR REGULATING FREEZE-
DRYING OPERATIONS
Louis Marie Antoine Rieutord, Boulogne-sur-Seine, France, assignor to Societe d'Utilisation Scientifique et Industrielle du Froid Usifroid, Boulogne-sur-Seine, France, a French body corporate
Filed Jan. 12, 1962, Ser. No. 165,865
Claims priority, application France, Jan. 17, 1961, 849,961, Patent 1,286,002
2 Claims. (Cl. 34—54)

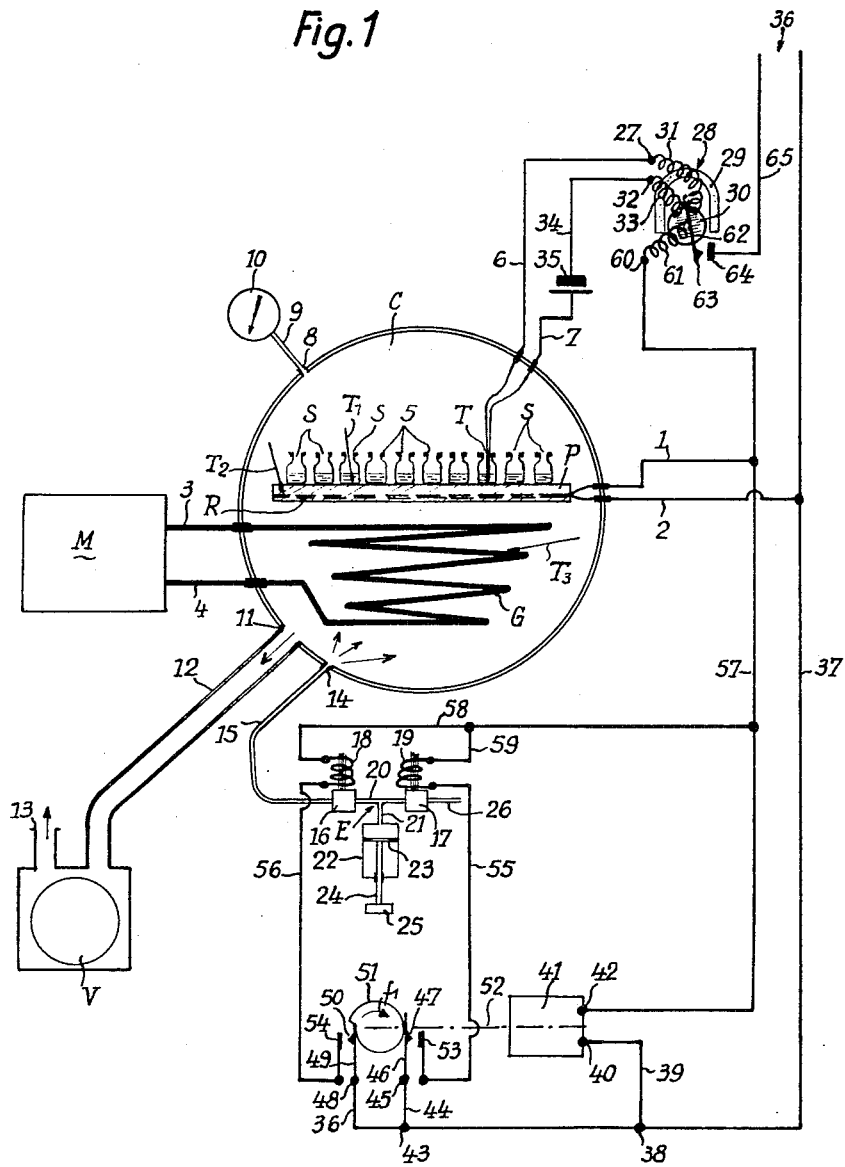

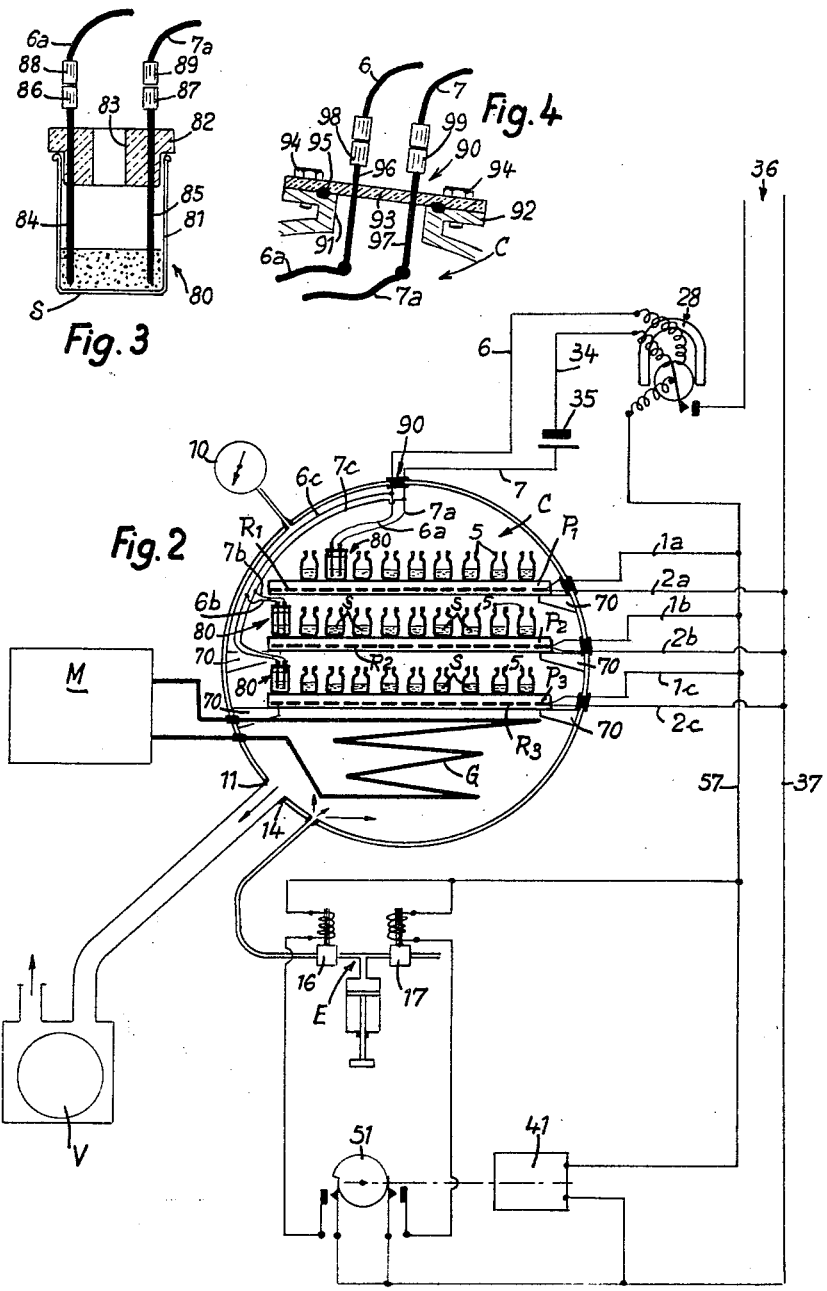

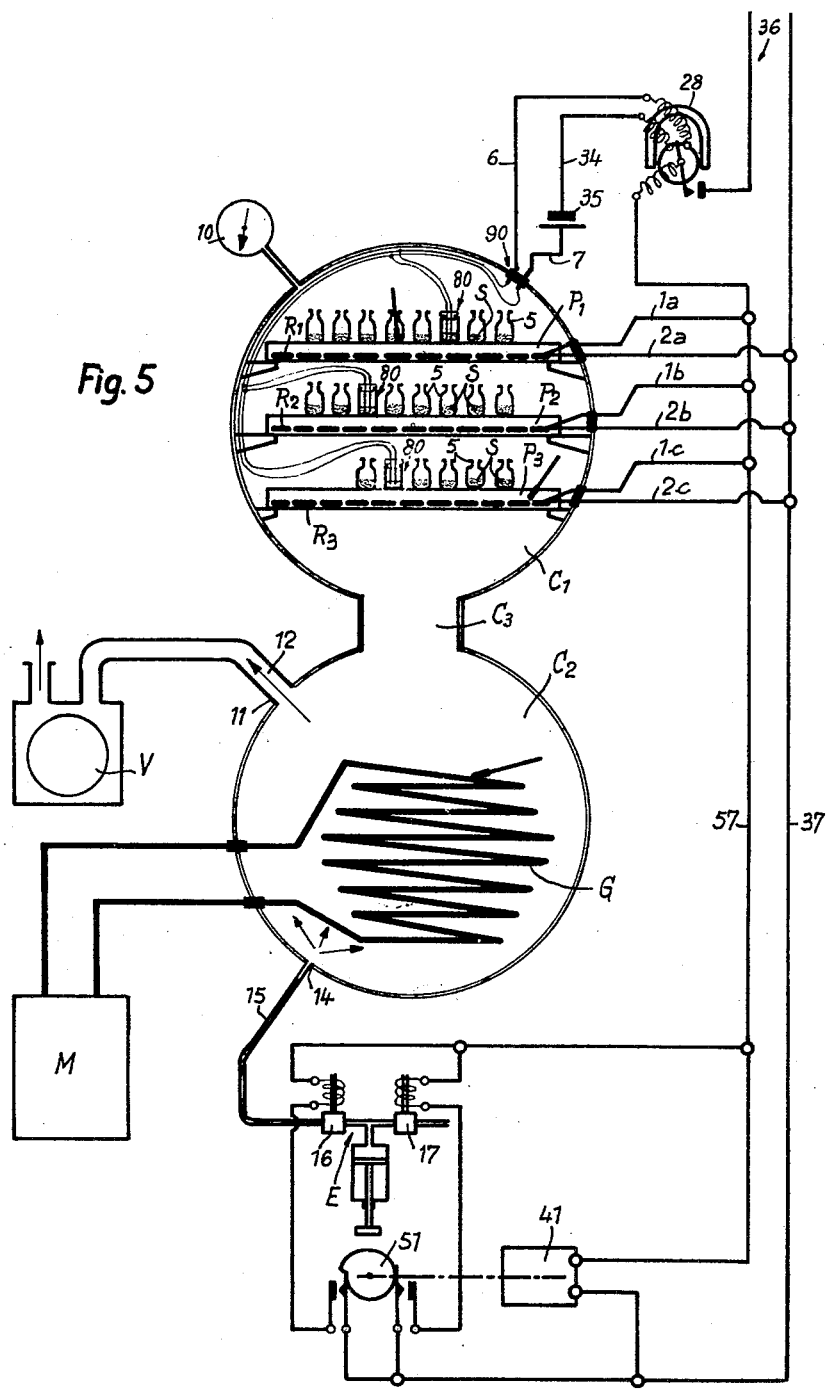

The present invention relates to apparatus for regulating freeze-drying or "lyophilisation" operations.

Lyophilisation is a process generally used at the present time for eliminating water from the structure of organic or mineral substances which do not permit conventional evaporation treatments.

It comprises essentially a drying operation carried out at low temperature and mostly under a high vacuum which permits the careful dehydration by direct sublimation of the ice of previously frozen aqueous substances.

During the entire duration of the operation the treated specimens must be maintained at a sufficiently low temperature to avoid any trace of melting.

It is possible to treat by this process substances of very diverse kinds, such as, for example, food products and natural or extracted biological substances. These different substances obviously require different operational conditions which can be determined as a function of one or several properties of the substance to be treated.

At first lyophilisation operations were carried out by controlling the temperature of the substance throughout the operation. It has also been proposed to use, for controlling the structure of the substance in the course of treatment, an electrical property of this substance, such as for example the electrical resistivity.

The control or verification of a given property of the substance is necessary; indeed, owing to the endothermic character of the sublimation, heat must be constantly supplied at the level of the sublimation surface, but this heat supply must not be excessive since it would bring about melting phenomena which it is essential to avoid in order not to damage the structure of the substance being treated.

Various heating systems can be used to this end, but as the entire operation is effected under a vacuum the heat transfer is sometimes effected with difficulty. Generally speaking, it can be said that the necessary energy only reaches its region of neutralisation, namely the sublimation surface, through a more or less large number of heat exchange surfaces and coverings of various shapes and conductibility. Thus, in the case of a frozen liquid contained in glass flasks or ampullae placed in metal boxes resting on electrically heated metal plates, the heat flux must pass through in succession: the heating electric resistance, the metal mass surrounding it, the metal wall of the box, the bottom of the glass flask and the mass of frozen product. The major part of this exchange therefore occurs by conduction.

However, owing to inevitable irregularities in mechanical construction it usually happens that the metal bottom of the box and the bottom of the ampullae do not rest exactly on their supports and gaps are interposed along the energy transfer line. In these gaps, in which there is a more or less high vacuum, the transfer of heat occurs essentially by radiation and convection. The relative importance of these two phenomena is a direct function of the residual pressure prevailing in the apparatus. In any case, however, the importance of these various vacuum regions is considerable and both the regularity and intensity of the heat transfer essentially depend thereupon.

Therefore it is clear that by acting on the total pressure prevailing within the drying enclosure it is possible to supervise and regulate the energy supply to the product being dried.

This total pressure is the result of the partial pressure of the steam coming from the sublimation of the ice contained in the substance and the pressure of the residual incondensable gases (generally air) within the enclosure.

It is known to supervise and regulate lyophilisation operations by determining the saturating steam pressure of the ice contained in the specimen. This determination can be effected by isolating by means of a detachable partition, the drying enclosure from the steam trap. This process possesses several disadvantages: on the one hand, the steam must not be condensed within the drying enclosure containing the products, since the variation in the saturating steam pressure of the ice is achieved, as mentioned hereinbefore, by isolating by means of a detachable partition the drying enclosure proper from the pumping device and from the means used for eliminating the sublimation water; this therefore requires a special apparatus and does not permit employing the very common apparatus in which the steam trap is placed in the drying enclosure itself; and, on the other hand, in this process it is the transfer rate of the steam to the steam trap which is acted upon, which transfer takes place only in a discontinuous manner. In this process the pressure of the incondensable gases is considered to be negligible.

The object of the present invention is to provide apparatus for carrying out the sublimation of the water contained in the product to be treated without risk of harming the structure of the latter (by a melting of the frozen product or the overheating of the dry product at the end of the operation) while maintaining the optimum sublimation rate throughout the operation.

The invention provides apparatus for regulating freeze-drying or lyophilisation operations in which the substance to be treated is placed in an enclosure in which it is possible to create a vacuum and on a support whose temperature can be varied, the water vapor leaving the substance being eliminated by condensing the same on refrigerator coils located in the enclosure, said apparatus being such that a continuous transfer of the water vapor from the substance to the trap is maintained and the total pressure prevailing within the enclosure is modified as a function of the variations in a given property of the substance, said pressure modification being achieved by introducing in the enclosure controlled amounts of incondensable gases.

In the ensuing description, gases which cannot be condensed under the operational conditions employed are termed incondensable gases.

The apparatus of the invention permits acting with precision on the temperature of the treated products and obtaining the automatic regulation thereof as a function of predetermined standards.

In increasing the possibilities of heat exchange without risk of melting the frozen products or overheating the dry product, it is possible to increase the speed of the operations for a given degree of safety and thereby improve the output or efficiency of the apparatus.

Further, owing to the increased heat exchanges it is possible to obtain the same heat transfer from heating surfaces brought to much lower temperatures and this increases the safety and lessens the risk of initial melting and of overheating at the end of the operation.

It permits a regulation of the whole of the charge.

If the water vapor trap is located directly within the drying enclosure of the apparatus, the variations in the total pressure of the enclosure do not substantially modify the transfer rate of the water vapor emitted which continues to be fixed on the condenser. This is a notable advantage over the previously-described devices which regulate the sublimation itself by determining the saturating water vapor pressure of the ice within the drying enclosure.

In the last case, as mentioned hereinbefore, the pressure of residual air or of gas other than water vapor must be considered as negligible. As opposed to this, in the process of the invention the partial pressure of the water vapor is constantly maintained at the minimum level that can be reached with the apparatus and the regulation of the total pressure in the enclosure is carried out by acting on the air or the incondensable gases that might be contained in the apparatus.

In one mode of carrying out the process, the frozen substance to be treated contained in suitable containers is disposed on one or several plates whose temperature can be varied, and the trap is a condenser adapted to receive the water vapor in the form of ice, a vacuum is created in the enclosure, the plates are brought to a temperature which is sufficient to maintain the sublimation of the water contained in the substance, the variations in the temperature of the substance are verified by means of an appropriate responsive device, the latter automatically controlling the introduction of incondensable gases in the chamber and, advantageously but not necessarily, at the same time the temperature of the plate or plates on which the substance is disposed.

Another object of the invention is to provide an apparatus for carrying out the process defined hereinbefore, said apparatus comprising in combination: an enclosure in which it is possible to create a vacuum, support means disposed in the enclosure and supporting the substance to be treated, means for varying the temperature of the support means, a device for creating a vacuum in the enclosure, a water vapor trap disposed in the enclosure, a device responsive to variations in a given property of said substance, means for introducing in the enclosure controlled amounts of incondensable gases, and an actuating device controlled by the responsive device for bringing into action said means for introducing the incondensable gases.

Further features and advantages of the invention will be apparent from the ensuing description with reference to the accompanying drawings, to which the invention is in no way limited.

In the drawings:

FIG. 1 is a diagrammatic view of an embodiment of a lyophilisation or freeze-drying apparatus for carrying out the process according to the invention;

FIG. 2 is a diagrammatic view of a modification of the apparatus shown in FIG. 1;

FIG. 3 is a sectional view, on an enlarged scale, of a resistivity measuring cell used in the apparatus shown in FIG. 2;

FIG. 4 is a sectional view, on an enlarged scale, of a detail of the apparatus shown in FIG. 2 showing how the conductors of the responsive device pass through the wall of the enclosure, and FIG. 5 is a diagrammatic view of another embodiment of the apparatus according to the invention.

With reference to the drawings and in particular to FIG. 1, it can be seen that the apparatus comprises a drying enclosure constituted by a chamber C within which are located support means, such as a plate P, having means for varying its temperature such as an electrical resistance R connected to power supply outside the chamber C by two conductors 1 and 2. The plate P is maintained in position in the chamber by any suitable means (not shown). Located within the chamber C below the plate P is a water vapor trap constituted in the presently-described embodiment, by an evaporator G of a refrigerator M, this evaporator being located within the chamber C, connected to the refrigerator M by pipes 3 and 4, and condensing the water vapor in the form of ice. This is why it will be referred to hereinafter as a condenser G.

Placed on the plate P are the containers 5 containing a substance to be treated S. These containers may have any suitable shape, for example they are glass jars open at one end. Disposed in one of the containers 5 and immersed in the substance S is a device responsive to a given property of the substance, for example a thermometric device T having a resistance connected to two conductors 6 and 7 leading out of the chamber.

The wall of the chamber has an aperture 8 through which the tube 9 of a vacuum indicator, such as a pressure gauge 10, communicates with the interior of the chamber. Another aperture 11 serves to connect the chamber C through the medium of a pipe 12 to a vacuum pump V (for example a rotary pump and/or a pump diffusing oil vapour) comprising an outlet to free air 13.

The chamber has a further aperture 14 through which communicates with the interior of the chamber a pipe 15 to which is connected a device for introducing incondensable gases into the chamber, the aperture 14 being preferably so disposed that the incondensable gases firstly cool around the condenser before reaching the vicinity of the substance. One embodiment of this device comprises two electromagnetic valves 16 and 17 respectively actuated by solenoids 18 and 19 and separated by a chamber having a variable volume E. This chamber E comprises a tube 20 to which is branch connected, through the medium of another tube 21, a cylinder 22 within which is slidable a piston 23 whose rod 24 carries a regulating knob 25. The valve 17 communicates with the exterior by way of a tube 26.

The drying chamber C is so constructed as to be capable of withstanding high vacuums.

The apparatus is completed by control or checking thermometers $T_1$, $T_2$, and $T_3$ placed in the substance to be treated, in the plate P, and on the condenser G respectively. The thermometric device T is connected by its conductor 6 to a terminal 27 of a galvanometer diagrammatically represented at 28. It comprises a magnet 29 and a frame 30 connected, on the one hand, to the terminal 27 by a flexible conductor 31 and, on the other hand, to a second terminal 32 by a flexible conductor 33. The terminal 32 is connected to the conductor 34 whose other end is connected to a terminal of a supply battery 35. Connected to the other terminal of the battery 35 is the conductor 7 of the thermometric device T. This assembly comprising the device T, the galvanometer, the battery, and the various conductors, constitutes what is hereinafter termed a device responsive to a given property of the product.

If desired, several thermometric devices disposed in the substance at various points of the support means and connected to the same galvanometer by an appropriate electric circuit, could be used.

The apparatus further comprises an actuating device which is controlled by the responsive device and actuates the electromagnetic valves 16 and 17 described hereinbefore.

This actuating device is supplied with energy by an electric current supply 36 by way of a conductor 37. Connected to the latter are: the conductor 2 of the resistance R heating the plate P; at 38, a conductor 39 leading to a terminal 40 of a small motor or motor-speed reducer unit 41 which has a second terminal 42; at 43, a conductor 44 leading to a terminal 45 of a movable conductive strip 46 (such as a resilient blade carrying a contact 47, the conductor 37 leading to a terminal 48 of a strip 49 of the same type as the strip 46 and carrying a contact 50.

Two strips 46 and 49 are in permanent contact, through the medium of their ends remote from the terminals 45 and 48, with the surface of a cam 51 comprising a step and driven in rotation in the direction of arrow $f_1$ by the motor 41 to which it is connected by a mechanical connection which is shown in dot-dash line at 52 and can be any suitable device, such as a shaft, belt, chain or gears. The ends of the strips in contact with the cam are electrically insulated from their respective contacts (this would not be necessary if the cam is of an electrically insulating material).

Facing the movable contacts 47 and 50 are two fixed contacts 53 and 54 respectively. These contacts are so disposed that the movable contacts 47 and 50 are applied thereagainst in a certain position of the cam 52. These fixed contacts 53 and 54 are respectively connected to a terminal of each one of the solenoids 18 and 19 of the valves 16 and 17 by conductors 55 and 56.

Leading from the terminal 42 of the motor 41 is a return conductor 57 to which are connected: a conductor 58 which leads to the second terminal of the solenoid 18 and is connected to a conductor 59 leading to a second terminal of the solenoid 19, and the conductor 1 of the resistance R.

The conductor 57 leads to a terminal 60 which a flexible conductor 61 connects to a point of a rod or index 62 rigid with the frame 30 of the galvanometer 28. The index 62 is connected to the frame 30 by any suitable means but it is electrically insulated therefrom. The index conducts the current to a contact 63 fixed at one of its ends. A fixed contact 64 is so disposed that the contact 63 is capable of coming into contact therewith under the effect of the frame 30 of the galvanometer. The contact 64 is connected to the A.C. supply 36 by a conductor 65.

The process according to the invention is carried out in the apparatus just described in the following manner:

The substance S placed in the containers 5—one or several of which contain a thermometric device having a resistance—is previously frozen. This freezing is often carried out at atmospheric pressure in a separate apparatus and a container containing the substance is thereafter placed on the plate P. The thermometric device or devices T placed in the substance in one or several chosen containers, as explained hereinbefore, is or are then connected to the circuit of the galvanometer 28. The refrigerator was started up so as to bring the condenser G to the required temperature, which is generally about $-50°$ to $-60°$ C.

The galvanometer is so adjusted that the contacts 63 and 64 separate when the temperature of the substance reaches the maximum chosen value, for example $t$. The latter varies with the type of substance to be treated and the chosen sublimation rate. The pump V is then actuated so as to create a vacuum in the drying chamber C and the conductors 37 and 65 are connected to the A.C. supply.

As the temperature of the substance is lower than the extreme chosen temperature $t$, the frame of the galvanometer urges the index 62 in the direction for applying the contact 63 against the contact 64. The actuating circuit is therefore closed, the motor 41 is supplied with current by the conductors 37 and 57 and rotates the cam 51 in the direction of arrow $f_1$ and the rise in the cam brings the contact 47 against the fixed contact 53, the contacts 50 and 54 being then separated and the valve 16 closed. The current then passes through the solenoid 19 of the valve 17 (by way of conductors 37 and 44, strip 46, contacts 47 and 53, conductor 55, solenoid 19, conductors 59, 58, 57, 61, index 62, contacts 63, 64, and conductor 65) and this solenoid opens the valve and allows the air coming from the tube 26 to fill the variable volume chamber E. The volume of this chamber, namely the volume available for the gases, is chosen according to needs by acting on the regulating knob 25 which determines the position of the piston 23 in the cylinder 22.

As the cam continues to rotate, the strip 46 drops down the step in the cam and the contact 46 moves away from the contact 53 and causes closure of the valve 17. At this moment the strip 49 is acted upon by the rise or boss of the cam and comes into contact with the contact 54 so that the current is then carried by the solenoid 18 which causes the valve 16 to open. The gas contained in the chamber E passes through the pipe 15 and enters the chamber C by way of the aperture 14. This arrival of a certain amount of gas increases the total pressure in the chamber C but it will be clear that the transfer of the steam from the substance to the trap constituted by the condenser G has not been modified.

When the strip 49 in turn drops down the step in the cam 51, the contacts 50 and 54 are separated and the positions shown in FIG. 1 are resumed. The profile of the cam is so designed that at least one of the two valves 16 or 17 is always closed so as to avoid any accidental supply of gas to the chamber C. The motor 41 continues to operate and the procedure of admission of the incondensable gases in the chamber C is reproduced in a regular manner. By this process it is possible to supply the chamber C with puffs of gas of given volume and, by modifying this volume in regulating the volume of the chamber E, it is possible to more or less act on the total pressure prevailing in the chamber C.

If it is desired to introduce an incondensable gas other than air (for example nitrogen), the tube 26 is connected to a suitable source of this gas.

While the incondensable gases are admitted into the chamber C the resistance R of the plate P is supplied with current by the conductors 1 and 2 connected to the conductors 57 and 37. This resistance therefore raises the temperature of the plate P simultaneously with the introduction of incondensable gases. As the supply of the gases raises the pressure prevailing in the chamber C, the temperature of the substance S rises owing to the improvement in the heat transfer from the plate to said substance due to increased convection phenomena. The simultaneous rise in the temperature in the plate P therefore increases this effect by an additional supply of heat and causes an even more rapid rise in the temperature of the substance.

While the actuating device is supplied with energy the temperature of the substance S rises. When it reaches the extreme fixed value $t$ the intensity of the current supplied by the battery 35 in the galvanometer circuit reaches the value at which the frame 30 and the index 62 are driven in such direction that the contacts 63 and 64 are separated. At this moment the circuit of the actuating device is opened and current no longer passes through the motor 41 nor in the valves 16 and 17 and in the resistance R. Consequently incondensable gas is no longer supplied, the pressure drops in the chamber C under the effect of the pump V and the thermal exchanges between the substance and the plate are slowed down. The sublimation, in continuing, takes the heat necessary thereto from the substance, the temperature of which drops. This temperature drop is still more accelerated if, as occurs in the presently-described apparatus, the supply of heat to the plate P is stopped. When the temperature of the substance is once more lower than the value $t$, the frame of the galvanometer is driven in the opposite direction and returns the contacts 63 and 64 to the position in which they bear against one another and the previously-described situation is resumed. This alternating procedure occurs in this way during the entire sublimation operation which is therefore perfectly regulated and controlled throughout the operation.

It is also possible to arrange the responsive device in such manner that said controlled property of the substance follows a pre-determined curve of variations instead of being maintained at a fixed value throughout the operation.

FIG. 2 shows a modification of the apparatus shown in FIG. 1. In this modification the support means is constituted by several separated plates, three of which are shown at $P_1$, $P_2$ and $P_3$. These plates are maintained in position by suitable means on brackets 70 secured to the wall of the chamber C. Electrical resistances $R_1$, $R_2$, $R_3$ are disposed in the plates $P_1$, $P_2$, $P_3$ respectively and are connected to the conductors 57 and 37 of the apparatus (FIG. 1) by conductors $1a$ and $2a$, $1b$ and $2b$ and $1c$ and $2c$ respectively in the same manner as the resistance R of the plate P shown in FIG. 1. Each plate $P_1$, $P_2$, $P_3$ carries a certain number of jars or flasks 5 identical to those shown in FIG. 1 and containing a certain amount of substance S to be treated. An electrical resistivity-measuring cell generally designated by the reference number 80 is placed on each of the plates and also contains some substance S. This cell is shown on an enlarged scale in FIG. 3. It comprises a container 81, for example of glass, having a flat bottom and closed at its upper end by a plug 82 of electrically insulating material comprising at its centre an aperture 83 allowing the vapours of the substance S to leave the container during the drying operation. Two conventional metal electrodes 84 and 85 extend through the plug 82 into the container 81 and are immersed in the substance S. They are held in position by the plug 82 in the annular insulating part of which they are tightly gripped. Disposed on the part of the electrodes outside the container are two connections 86 and 87 which are connected by any suitable means, such as soldering or screwing, to two terminals 88 and 89 secured to conductors $6a$ and $7a$ for example of the responsive device.

FIG. 2 shows the cells 80 connected in parallel to the conductors 6 and 7 of the responsive device by the conductors $6a$ and $7a$ (plate $P_1$), $6b$, $7b$ (plate $P_2$) and $6c$, $7c$ (plate $P_3$) as shown ($6c$ and $7c$ being connected respectively to $6a$ and $7a$ and $6b$ and $7b$ being connected respectively to $6c$ and $7c$). The conductors $6a$ and $7a$ are connected to the conductors 6 and 7 through the wall of the chamber C by means of a fluid-tight and electrically insulating device generally indicated by the reference numeral 90 and shown on an enlarged scale in FIG. 4. This device 90 is secured against an aperture 91 in the wall of the chamber C, this aperture having an outer flange 92 against which is applied in a strictly fluid-tight manner a plate 93 of electrically insulating material held in position by screws 94, a sealing ring 95 being disposed between the flange and the plate. Two metal rods 96 and 97 conductive of electricity extend in a fluid-tight manner through the plate 93 and connect the conductors $6a$ and $7a$ to the conductors 6 and 7 respectively. Terminals 98 and 99 are disposed at the ends of the rods 96 and 97 disposed outside the chamber C. In this modification the predetermined property of the substance S is the electrical resistivity. This measurement is carried out in the usual manner by passing an electric current supplied by the battery 35 through the substance S by means of the electrodes 84 and 85. The galvanometer 28 is no longer set with respect to a reference temperature as in the apparatus shown in FIG. 1 but with respect to a predetermined reference value of the electrical resistivity of the substance to be treated. The apparatus operates in the same manner as the apparatus shown in FIG. 1.

FIG. 5 shows an embodiment of an apparatus which differs from that shown in FIG. 2 in that the drying enclosure is constituted by two chambers $C_1$ and $C_2$ interconnected by a tubular portion $C_3$ defining a permanently open passageway between the chambers $C_1$ and $C_2$. Disposed in the chamber $C_1$ are three plates $P_1$, $P_2$ and $P_3$ carrying the containers 5 containing the substance S and cells 80 for measuring the electrical resistivity of this substance, these cells being connected to the rest of the apparatus as described hereinbefore with reference to FIG. 2. The condenser G is placed in the chamber $C_2$ to which are connected by way of the pipes 12 and 15 the vacuum pump V and the device supplying the incondensable gases to the chamber $C_2$.

The apparatus operates in the same way as the apparatus shown in FIG. 2.

Two examples fo the application of the process according to the invention will now be given merely for purposes of illustration.

*Example 1*

Milk was placed in 5 cc. jars, the depth of the milk being the same in each jar (14 mm.). The temperature was used as the reference value and it was possible to maintain this temperature at −18° C. throughout the sublimation (4 hours 20 minutes).

The total pressure within the drying chamber oscillated around 0.3 Torricelli (Torr.).

*Example 2*

A test was carried out on horse serum at a depth of 5 mm. in 4 cc. flasks, the electrical resistivity of the substance being used as the reference property. A reference test was carried out on the same amounts of serum but without using the process of regulation according to the invention. The results obtained are shown in the following table:

| | Reference Test | Test with regulation according to the invention |
|---|---|---|
| Temperature of the product in the course of sublimation. | Between −45° C. and −20° C. | Between −25° C. and −30° C. |
| Mean temperature of the plates. | 180° C. | 50° C. |
| Total pressure in the chamber. | 0.03 Torr. | Between 0.1 and 0.25 Torr. |
| Total duration of the sublimation. | 6 hours. | 4 hours. |

Thus it was possible to reduce the sublimation time from 6 hours to 4 hours while operating at a considerably lower plate temperature. It is also clear that the temperature of the product is much more regular during the sublimation.

This is an important advantage of the process according to the invention.

Although specific embodiments of the invention have been described, many modifications and changes may be made therein without departing from the scope of the invention as defined in the appended claims.

Thus the electrical resistance R could be replaced if desired by piping in which is circulated a current of fluid; in this case the conductors 1 and 2 would be connected to various suitable devices which would vary the flow of this fluid and if desired its temperature as a funtion of the signals received by the responsive device.

If desired, the devices for varying the temperature of the support means could be controlled separately so that this variation is independent of the regulation of the total pressure prevailing in the chamber. For example, it is possible, without departing from the scope of the invention, to maintain the supporting means at a constant temperature and carry out the operation by acting solely on the total pressure prevailing in the chamber.

Having now described my invention what I claim as new and desire to secure by Letters Patent is:

1. Apparatus for freeze drying a frozen substance containing a frozen liquid under vacuum comprising a chamber, means for continuously removing gas from the chamber thereby to maintain a vacuum in the chamber, means for applying heat to a frozen substance within the chamber, and means actuated by temperature of the frozen substance below a predetermined minimum for injecting a low boiling gas into the chamber while said frozen substance still contains said frozen liquid, thereby to increase the heat transfer to the frozen substance by conduction through said injected low boiling gas.

2. Apparatus for freeze drying a frozen substance containing a frozen liquid under vacuum comprising a chamber, means for continuously removing gas from the chamber thereby to maintain a vacuum in the chamber, means for applying heat to a frozen substance within the chamber, and means actuated by internal electrical conductivity of the frozen substance below a predetermined minimum for injecting a low boiling gas into the chamber while said frozen substance still contains said frozen liquid, thereby to increase the heat transfer to the frozen substance by conduction through said injected low boiling gas.

References Cited by the Examiner

UNITED STATES PATENTS

| | | | |
|---|---|---|---|
| 1,799,249 | 4/31 | Reinhardt | 34—37 X |
| 2,435,503 | 2/48 | Levinson. | |
| 2,453,033 | 11/48 | Patterson | 34—5 X |
| 2,486,876 | 11/49 | Protzeller. | |
| 2,515,098 | 7/50 | Smith | 34—5 |
| 2,994,132 | 8/61 | Neumann | 34—5 |
| 3,077,036 | 2/63 | Neumann | 34—5 |
| 3,078,586 | 2/63 | Rey | 34—5 |

NORMAN YUDKOFF, *Primary Examiner.*